(12) United States Patent
Fralich et al.

(10) Patent No.: US 6,218,457 B1
(45) Date of Patent: *Apr. 17, 2001

(54) HOT MELT ADHESIVE WITH HIGH PEEL AND SHEAR STRENGTHS FOR NONWOVEN APPLICATIONS

(75) Inventors: Margaret M. Fralich, Milwaukee; Mark Alper, Mukwonago, both of WI (US)

(73) Assignee: Ato Findley, Inc., Wauwatosa, WI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,357

(22) Filed: Mar. 3, 1999

Related U.S. Application Data

(63) Continuation of application No. 08/848,321, filed on Apr. 30, 1997, now abandoned.

(51) Int. Cl.[7] .............................. C08L 23/20; C08L 91/06; C08K 5/01
(52) U.S. Cl. ......................... 524/489; 524/270; 524/477; 524/484; 524/487; 524/515
(58) Field of Search ..................................... 524/270, 271, 524/487, 515, 489, 484, 477; 525/240

(56) References Cited

U.S. PATENT DOCUMENTS

| | | | |
|---|---|---|---|
| 4,761,450 | * 8/1988 | Lakshmanan et al. | 524/487 |
| 4,826,909 | * 5/1989 | Lakshmanan et al. | 524/478 |
| 4,833,192 | * 5/1989 | Lakshmanan et al. | 524/478 |
| 4,937,138 | * 6/1990 | Mostert | 524/488 |
| 4,956,207 | * 9/1990 | Kaufman et al. | 525/240 |
| 5,024,888 | * 6/1991 | Hwo et al. | 524/504 |
| 5,041,492 | * 8/1991 | Koprowicz et al. | 524/271 |
| 5,106,447 | * 4/1992 | Di Rado et al. | 156/334 |
| 5,256,717 | * 10/1993 | Stauffer et al. | 524/270 |
| 5,455,111 | * 10/1995 | Urey | 428/355 |

FOREIGN PATENT DOCUMENTS

| | | |
|---|---|---|
| 0314495 | * 5/1989 | (EP) . |
| 96/23042 | * 8/1996 | (WO) . |
| 97/38739 | * 10/1997 | (WO) . |
| 97/39075 | * 10/1997 | (WO) . |

* cited by examiner

Primary Examiner—Tae Yoon
(74) Attorney, Agent, or Firm—Andrus, Sceales, Starke & Sawall, LLP

(57) ABSTRACT

A polybutylene based hot melt adhesive composition having a variety of end uses, particularly in construction and elastic attachment applications for nonwoven articles such as disposable diapers. Unlike typical hot melt adhesives, the present composition can withstand high peel and shear loads at elevated temperatures for extended periods of time without experiencing catastrophic bond failure. The composition includes polybutylene polymer or a mixture of polybutylene and polyolefin polymers, and a stabilizer, with the remaining ingredients chosen from one or more of a polyolefin polymer, a tackifier resin, a plasticizer, or a wax. The hot melt adhesive composition can be applied using common application techniques such as extruding or spraying.

6 Claims, 2 Drawing Sheets

HOT MELT ADHESIVE WITH HIGH PEEL AND SHEAR STRENGTHS FOR NONWOVEN APPLICATIONS

CROSS-REFERENCE TO RELATED APPLICATIONS

This is a continuation of prior application Ser. No. 08/848,321 filed Apr. 30 1997, now abandoned.

STATEMENT REGARDING FEDERALLY SPONSORED RESEARCH OR DEVELOPMENT

N/A

BACKGROUND OF THE INVENTION

The present invention relates to hot melt adhesive compositions, and more particularly to a polybutylene based hot melt adhesive which finds utility in nonwoven disposable absorbent articles such as diapers.

Numerous types of nonwoven disposable absorbent articles are commercially available, and are manufactured for use in the absorption and containment of bodily waste such as urine and feces. Typical of such articles are disposable diapers for infants, and undergarments for incontinent adults. Hot melt adhesives are typically used in the construction of such disposable articles.

While a wide range of hot melt adhesive compositions are known and used in the construction of disposable articles, it is also well known that a hot melt adhesive used for bonding in a particular use or application may be completely unsuitable for other uses or applications. Thus, various hot melt adhesive compositions are used in the construction of disposable articles. For example, it is well known that polyolefin based hot melt adhesives are suitable for the construction of diapers, particularly in the bonding of polyethylene films, or the like, to tissue or nonwoven substrates in the production of such articles. However, it is also known that polyolefin based hot melt adhesives are not suitable for bonding of the elastic bands in the diapers because the application characteristics, e.g. sprayability, of polyolefin based adhesives is undesirable for such an application. For this reason, hot melt adhesives based on styrenic block copolymers such as styrene-isoprene-styrene (SIS) block copolymers or styrene-butadiene-styrene (SBS) block copolymers are used for elastic attachment applications. These styrenic block copolymer adhesives, however, also possess shortcomings such as viscosity instability which manifests itself at elevated temperature.

More importantly, the shortcomings of conventional SIS and SBS based hot melt adhesives are particularly manifested in nonwoven applications which require seaming, such as the attachment of elastic side panels to diapers, or adhering of functional attachments such as fastening tape to disposable diapers. Oftentimes such components are required to function at body temperature under high peel stress and/or high shear stress for long periods of time. In such instances, the peel strength and shear strength of conventional adhesives are insufficient. As a result, such applications typically required mechanical bonding, such as ultrasonic welding or a combination of mechanical bonding with an adhesive assist. The equipment used in such applications, however, is often costly requires frequent maintenance, and can limit line speed.

BRIEF SUMMARY OF THE INVENTION

The present invention is directed to a hot melt adhesive composition which possesses certain physical properties that makes it ideally suited for use with nonwoven disposable articles. More particularly, the hot melt adhesive of the present invention maintains acceptable bond strength when subjected to severe peel and/or shear loads at elevated temperatures for extended periods of time. The adhesives of the present invention are thus suitable for use in nonwoven applications which currently rely on mechanical bonding techniques or a combination of mechanical bonding with an adhesive assist. The adhesives of the present invention have a viscosity of less than 25,000 cP at 350° F., and a melt point higher than 250° F.

The hot melt adhesive composition of this invention can be especially useful in applications in disposable nonwoven articles such as diapers or training pants. In particular, the adhesive composition is suitable to bond various laminates of elastic or non-elastic materials. More specifically, the adhesive may be used to bond elastic diaper side panels to various substrates such as nonwoven, polyethylene, polypropylene, and the like.

The hot melt composition of this invention also provides excellent construction bonds when tested via standard peel strength tests. In addition, these adhesives have physical properties which make them easily processable in conventional hot melt equipment.

The hot melt adhesive composition of the present invention comprises a blend of the following ingredients:
 (a) about 15% to 65% by weight of a polybutylene homopolymer or copolymer;
 (b) about 0.1% to about 3% by weight of a stabilizer; and
 the remaining ingredients, depending upon the specific end use and properties desired, being chosen from one or more of the following components so that the ingredients comprise 100% by weight based on the weight of the entire composition:
 (c) about 0% to 70% by weight of a polyolefin polymer;
 (d) about 0% to 60% by weight of a tackifying resin;
 (e) about 0% to 30% by weight of a plasticizer; and
 (f) about 0% to 20% by weight of a wax.

The minimum polybutylene polymer content in the composition should be about 15% by weight.

A preferred hot melt adhesive composition functioning without a plasticizer to provide adequate bond strength under extreme peel and shear loads at elevated temperature for extended periods of time comprises a blend of the following:
 (a) about 19.9% by weight of a polybutylene homopolymer;
 (b) about 29.9% by weight of a tackifying resin;
 (c) about 39.8% by weight of a polyolefin copolymer;
 (d) about 9.5% by weight of a polyethylene wax; and
 (e) about 0.9% by weight of a stabilizer.

Another hot melt adhesive composition functioning without a plasticizer comprises a blend of the following:
 (a) about 25% by weight of a blend of polybutylene homopolymer and copolymer;
 (b) about 25% by weight of a tackifying resin;
 (c) about 19.5% by weight of a wax;
 (d) about 30% by weight of a polyolefin polymer; and
 (e) about 0.5% by weight of a stabilizer.

A preferred hot melt adhesive composition functioning without wax and without a plasticizer while providing adequate bond strength comprises a blend of the following:
 (a) about 20% by weight of a polybutylene homopolymer;

(b) about 30% by weight of a tackifying resin;

(c) about 29% by weight of a polyolefin copolymer;

(d) about 1% by weight of a stabilizer; and (e) about 20% by weight of a polybutylene copolymer.

A preferred hot melt adhesive composition functioning without a polyolefin polymer while providing adequate bond strength under extreme peel and shear loads at elevated temperatures comprises a blend of the following:

(a) about 50% by weight of a polybutylene copolymer;

(b) about 15% by weight of a tackifying resin;

(c) about 15% by weight of a plasticizer;

(d) about 19.5% by weight of a wax; and (e) about 0.5% by weight of a stabilizer.

A preferred hot melt adhesive composition functioning without a tackifying resin or a polyolefin polymer while providing adequate bond strength under extreme peel and shear loads at elevated temperatures comprises a blend of the following:

(a) about 65% by weight of a polybutylene copolymer;

(b) about 19.5% by weight of a wax;

(c) about 15% by weight of a plasticizer; and (d) about 0.5% by weight of a stabilizer.

The hot melt adhesive compositions of the present invention thus provide bonds with excellent resistance to peel and shear forces at elevated temperatures for extended periods of time, and provide an alternative to mechanical bonding, especially of laminates, in a nonwoven disposable article. The prefered adhesive compositions are formulated so as to withstand a peel mode force of 500 grams at 100° F. for a minimum of about 11 hours and further withstands a shear mode force of 1000 grams at 100° F. for a minimum of about 11 hours.

DETAILED DESCRIPTION OF THE INVENTION

Figure 1:
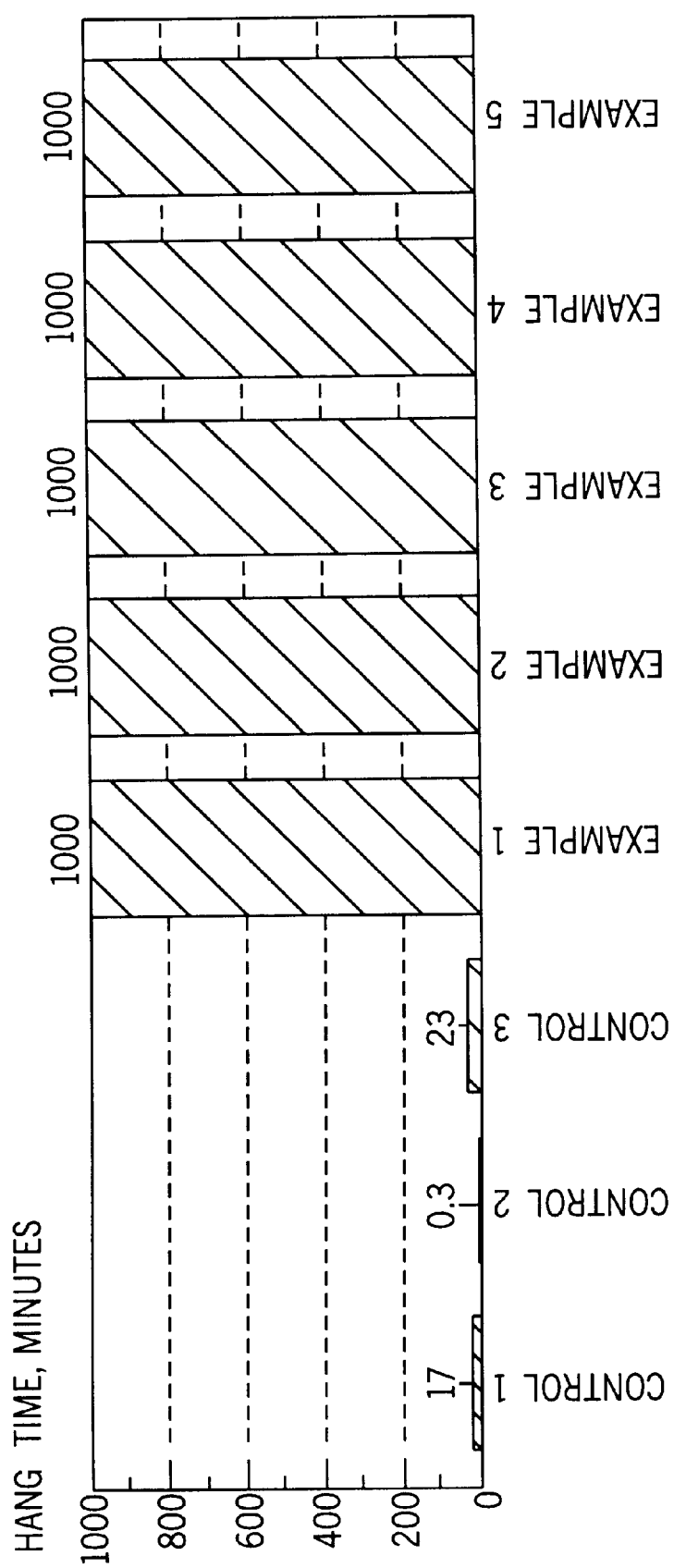
FIG. 1 is a bar graph illustrating the peel strength of hot melt adhesives formulated in accordance with the present invention versus prior art hot melt adhesives.
Figure 2:
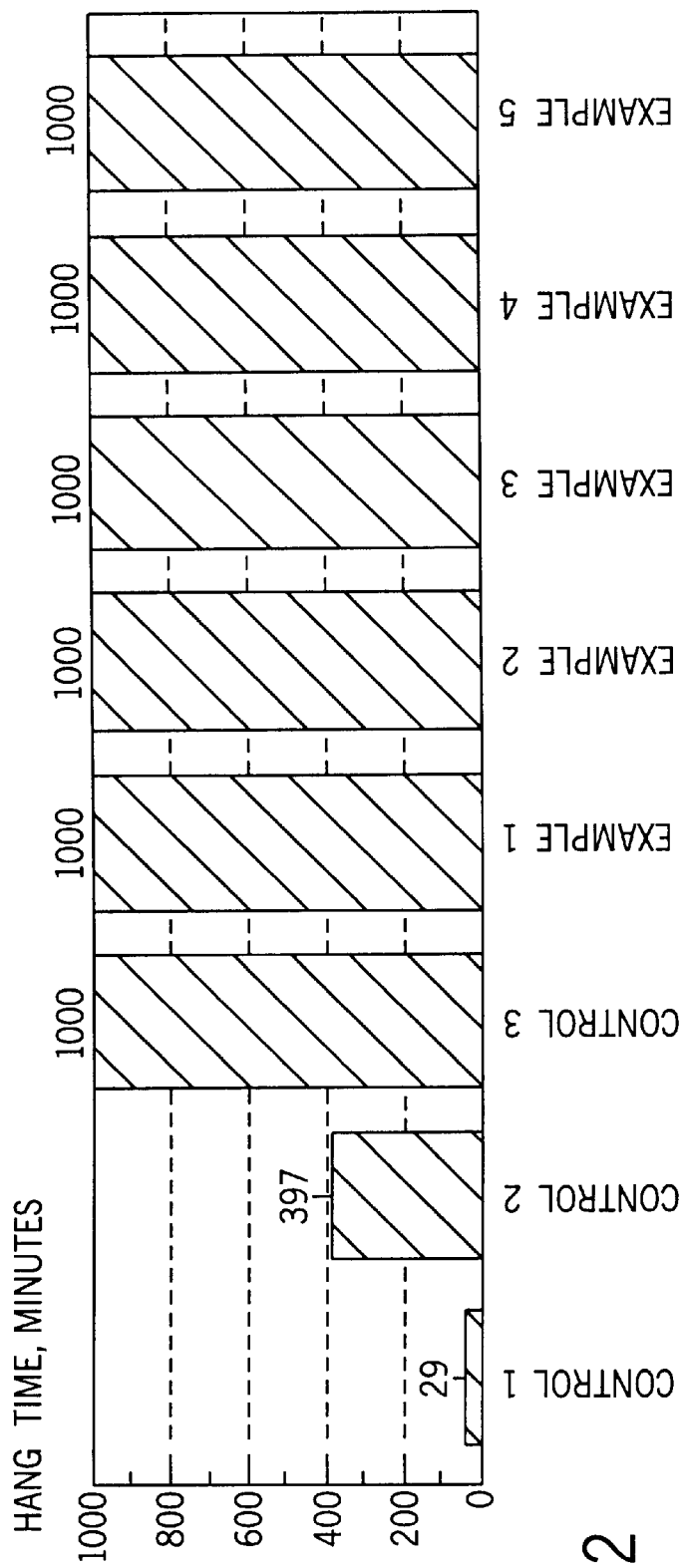
FIG. 2 is a bar graph illustrating the shear strength of hot melt adhesives formulated in accordance with the present invention versus prior art hot melt adhesives.

A polybutylene based hot melt adhesive composition having ingredients in the following ranges provides advantages over current hot melt adhesive technology when evaluated for bond strength under high shear and high peel applications in nonwoven disposable articles. More particularly, the adhesive composition includes about 15% to 65% by weight of polybutylene homopolymer or copolymer based on the entire weight of the composition. The minimum polybutylene polymer content in the composition should be about 15% by weight. Depending on end use and desired properties, the polyolefin ingredient may be absent, but is typically present in an amount of from about 0% to about 70% by weight. The hot melt adhesive composition of the present invention also includes about 0.01% to about 3% by weight stabilizer, and depending on specific end use and properties desired optionally may include about 0% to about 60% tackifying resin, about 0% to about 30% by weight plasticizer, or about 0% to about 20% by weight wax. Obviously, however, the ingredients must comprise 100% by weight of the composition, and the percentages set forth herein are based on the weight of the entire adhesive composition.

The polybutylene component is used in the thermoplastic hot melt adhesive of the present invention to enhance the strength of the adhesive bond of the material at elevated temperatures, especially to provide high peel strength and high shear strength to the composition. As used herein, the term "polybutylene polymer" refers to those polymeric entities comprised of ethylene and butene monomers where the butene monomeric unit comprises at least 89% of the copolymer. A suitable commercially available butene-1-ethylene copolymer can be obtained from Shell Chemical Company of Houston, Tex. under the trade name Duraflex 8910 PC or Duraflex 8510 or a suitable homopolymer is DP 0800 also available from Shell Chemical Company. The preferred materials have a DSC melting point of approximately 90° C. or higher. Although a range of 15–65% by weight polybutylene polymer may be used, the preferred range is 20% to 50% based on the entire weight of the composition.

Butene-1-homopolymers and copolymers which are useful in the present invention are primarily linear chain molecules with regular and spatially ordered arrangements of ethyl side groups. These side groups are the result when butene-1 is polymerized across the 1, 2 carbon double bond, and along an ethylene chain backbone. This is described in further detail in U.S. Pat. No. 3,362,940. When cooled from a melt, the ethyl side groups initially align in a tetragonal spatial arrangement. With time the tetragonal crystalline phase form transfers into a stable hexagonal spatial arrangement with a subsequent development of improved physical properties. A more thorough discussion of the polymer utilized herein may be found in the reference to Mostert, U.S. Pat. No. 4,937,138, the contents of which is incorporated by reference herein. As will be seen from the disclosure above, the present polymer is useful in amounts of about 15% to about 65%, by weight.

The amorphous polyolefin polymer component, of the composition of the present invention preferably is a polyalpha-olefin copolymer which is a copolymer based on repeating units of ethylene, propylene, butene and hexene. They may be comprised of alternating repeating units of the following monomer combinations:

(a) Ethylene and propylene;

(b) Ethylene and butene;

(c) Propylene and butene;

(d) Ethylene, propylene and butene;

(e) Propylene and hexene; or (f) Propylene.

Suitable copolymers are commercially available from Huls America under the trade name "Vestoplast," or from Rexene Products under the trade name "Rextac." Those with a softening point range of about 100° C. to 160° C. are preferred. It will be recognized that mixtures of any of the above copolymers also may be used as base components in the compositions of the present invention. The poly-olefin polymer functions to help provide adhesion to nonporous substrates. Although a range of 0–70% by weight poly-olefin polymer may be used, the preferred range is 20% to 40% by weight based on the entire weight of the composition.

It should be noted that mixtures of the polybutylene polymer and poly-olefin polymer may also be used as long as a sufficient amount of polybutylene polymer is employed to impart the desired amount of peel and shear strength to the adhesive composition. The minimum polybutylene polymer content in the composition should be about 15%. However, depending on the end use, and as noted by the ranges set forth above, the poly-olefin component could be completely absent from the composition.

The tackifying resins which are used in the hot melt construction adhesives of the present invention are those which extend the adhesive properties and improve the specific adhesion of the polybutylene copolymer and/or the polyalpha-olefin copolymer. As used herein, the term "tackifying resin" includes:

(a) natural and modified rosin such as, for example, gum rosin, wood rosin, tall-oil rosin, distilled rosin, hydrogenated rosin, dimerized rosin and polymerized rosin;

(b) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of pale wood rosin, the pentaerythritol ester of hydrogenated rosin, the pentaerythritol ester of tall oil rosin and the phenolic modified pentaerythritol ester of rosin;

(c) polyterpene resins having a softening point, as determined by ASTM method E28-58T, of from about 60° C. to 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins;

(d) copolymers and terpolymers of natural terpenes, e.g. styrene/terpene, α-methyl styrene/terpene and vinyl toluene/terpene;

(e) phenolic-modified terpene resins such as, for example, the resin product resulting from the condensation, in an acidic medium, of a terpene and a phenol;

(f) aliphatic petroleum hydrocarbon resins having Ring and Ball softening points of from about 60° to 140° C., the latter resins resulting from the polymerization of monomers consisting primarily of olefins and diolefins; also included are the hydrogenated aliphatic petroleum hydrocarbon resins; examples of such commercially available resins based on a $C_5$-olefin fraction of this type are "Wingtack 95" and "Wingtack 115" tackifying resins sold by Goodyear Tire and Rubber Company;

(g) aromatic petroleum hydrocarbons and the hydrogenated derivatives thereof;

(h) aliphatic/aromatic petroleum derived hydrocarbons and the hydrogenated derivatives thereof.

Mixtures of two or more of the above described tackifying resins may be required for some formulations. Although a range of 10–60% by weight tackifying resin may be used, the preferred range is 20% to 50%.

As noted above, tackifying resins which are useful within the scope of the present invention comprise about 0% to about 60% by weight of the entire composition, and when used therein, preferably comprise about 10% to 30% by weight of the composition. The tackifying resins are preferably selected from any of the nonpolar types, which are commercially available. An example of a commercially available tackifying resin which is useful for the present invention includes the resin which is identified commercially by the trade name Escorez 1315 and which is manufactured by Exxon Chemical Company. Another commercially available resin that may be used in the present formulation is available under the trade name "Eastotac" from Eastman Chemical Company. Normally, nonpolar tackifying resins which are useful with the present invention include resins which are partially, or completely hydrogenated $C_9$ or $C_5$ based hydrocarbon resins with softening points that are in a range of approximately 10° C. to approximately 125° C. Tackifying resins which are useful for the present invention can perhaps also include polar tackifying resins. However, the choice of available polar tackifying resins is limited in view of the fact that many of the polar resins are only partially compatible with the butene-1-homopolymer, and copolymers.

A plasticizer can be optionally present in the composition of the present invention in amounts of about 0% to about 30%, by weight based on the entire weight of the composition, preferably from about 5% to about 15%, in order to provide desired viscosity control. A suitable plasticizer may be selected from a group which not only includes the usual plasticizing oils, such as mineral oil, but also olefin oligomers and low molecular weight polymers (e.g. polybutenes having a low molecular weight of 2000 or less), as well as vegetable and animal oil and derivatives of such oils. The petroleum derived oils which may be employed are relatively high boiling temperature materials containing only a minor proportion of aromatic hydrocarbons. In this regard, the aromatic hydrocarbons should preferably be less than 30%, and more particularly less than 15%, by weight, of the oil. Alternately, the oil may be totally non-aromatic. The oligomers may be polypropylenes, polybutenes, hydrogenated polyisoprene, hydrogenated butadiene, or the like having average molecular weights between about 350 and about 10,000. Suitable vegetable and animals oils include glycerol esters of the usual fatty acids and polymerization products thereof. The plasticizers that find usefulness in the present invention can be any number of different plasticizers but the inventors have discovered that a plasticizer which includes a mono-olefin polymer such as what is commercially available under the trade name Indopol H-100, a butene based mono-olefin polymer which is manufactured by Amoco, and has a low molecular weight of 2000 or less, is particularly useful in the present invention. As will be appreciated, plasticizers have typically been employed to lower the viscosity of the overall adhesive composition without substantially decreasing the service temperature of the adhesive. If a plasticizer is employed in the composition, however, the amount of polybutylene must be increased to compensate for the plasticizer to maintain the necessary high peel strength desired for these adhesives.

The waxes which can be used in amounts varying between 0% to 20% by weight, preferably 5% to 20%, in the composition of the present invention are used to reduce the melt viscosity of the hot melt construction adhesives without appreciably decreasing their adhesive bonding characteristics. These waxes may also be used to reduce the open time of the composition without effecting temperature performance. Among the useful waxes are:

(1) low molecular weight, that is, 1000–6000, polyethylene having a hardness value, as determined by ASTM method D-1321, of from about 0.1 to 120 and ASTM softening points of from about 150° to 250° F.;

(2) petroleum waxes such as paraffin wax having a melting point of from about 130° to 175° F. and microcrystalline wax having a melting point of from about 135° to 200 F., the latter melting points being determined by ASTM method D127-60;

(3) atactic polypropylene having a Ring and Ball softening point of from about 120° to 160° C.;

(4) synthetic waxes made by polymerizing carbon monoxide and hydrogen such as Fischer-Tropsch wax; and (5) polyolefin waxes. As used herein, the term "polyolefin wax" refers to those polymeric or long-chain entities comprised of olefinic monomer units, such as ethylene or propylene. These materials are commercially available from Eastman Chemical Co. under the trade name "Epolene." The materials which are preferred for use in the compositions of the present invention have a Ring and Ball softening point of 200° F. to 350° F. As should be understood, each of these wax diluents is solid at room temperature. Other useful substances include hydrogenated animal, fish and vegetable fats and oils such as hydrogenated tallow, lard, soya oil, cottonseed oil, castor oil, menhaden oil, cod liver oil, etc., and which are solid at ambient temperature by virtue of their being hydrogenated, have also been found to be useful with respect to functioning as a wax diluent equivalent. These hydrogenated materials are often referred to in the adhesives industry as "animal or vegetable waxes."

The present invention includes a stabilizer in an amount of from about 0.1% to about 3% by weight, but preferably from about 0.1% to 1%. The stabilizers which are useful in the hot melt adhesive compositions of the present invention are incorporated to help protect the polymers noted above, and thereby the total adhesive system, from the effects of thermal and oxidative degradation which normally occurs during the manufacture and application of the adhesive as well as in the ordinary exposure of the final product to the ambient environment. Such degradation is usually manifested by a deterioration in the appearance, physical properties and performance characteristics of the adhesive. Among the applicable stabilizers are high molecular weight hindered phenols and multifunctional phenols, such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency and correspondingly, its reactivity; this steric hindrance thus providing the phenolic compound with its stabilizing properties. Representative hindered phenols include:

1,3,5,-trimethyl-2,4,6-tris(3-5-di-tert-butyl-4-hydroxybenzyl) benzene;
pentaerythritol tetrakis-3(3,5-di-tert-butyl-4-hydroxyphenyl) propionate;
n-octadecyl-3(3,5-di-tert-butyl-4-hydroxyphenyl) propionate;
4,4'-methylenebis(4-methyl-6-tert butylphenol);
4,4'-thiobis(6-tert-butyl-o-cresol);
2,6-di-tert-butylphenol;
6-(4-hydroxyphenoxy)-2,4-bis(n-ocytlthio)-1,3,5-triazine;
2,4,6-tris(4-hydroxy-3,5-di-tert-butyl-phenoxy)-1,3,5-triazine;
di-n-octadecyl-3,5-di-tert-butyl-4-hydroxybenzylphosphonate;
2-(n-octylthio)ethyl-3,5-di-tert-butyl-4-hydroxybenzoate; and
sorbitol hexa-(3,3,5- di-tert-butyl-4-hydroxy-phenyl) propionate.

Especially preferred as a stabilizer is pentaerythritol tetrakis-3(3,5-di-tert-butyl-4-hydroxyphenol) propionate.

The performance of these stabilizers may be further enhanced by utilizing, in conjunction therewith; (1) synergists such as, for example, thiodipropionate esters and phosphites; and (2) chelating agents and metal deactivators as, for example, ethylenediaminetetraacetic acid, salts thereof, and disalicylalpropylenediimine.

The hot melt adhesive composition of the present invention may be formulated using any of the techniques known in the art. A representative example of the prior art procedure involves placing all of the substances, in a jacketed mixing kettle, and preferably in a jacketed heavy duty mixer of the Baker-Perkins or Day type, and which is equipped with rotors, and thereafter raising the temperature of this mixture to a range of about 250° F. to 375° F. It should be understood that the precise temperature to be used in this step would depend on the melting point of the particular ingredients. The resulting adhesive composition is agitated until the ingredients completely dissolve. A vacuum is then applied to remove any entrapped air.

It should be understood that other optional additives may be incorporated into the adhesive composition of the present invention in order to modify particular physical properties. These may include, for example, materials such as colorants, fillers, etc.

Products in accordance with the present invention have been developed which can withstand shear and peel forces at elevated temperatures on porous substrates. These adhesives may be applied by conventional methods—both contact and non-contact—and are flexible and tack-free when set. In order to perform adequately, it has been determined that these adhesives must be able to withstand peel forces of 500 g per inch at 100° F. for a minimum of about 11 hours and shear forces at 100° F. of 1000 g for a minimum of about 11 hours. This is accomplished by forming a mechanical bond with the substrates which resists deformation. Although slightly higher in viscosity than conventional compositions, these new adhesives still are easily processed by standard application equipment and have adequate flexibility while maintaining high strength.

Test Conditions for High Shear-High Peel Formulas

LAMINATE CONSTRUCTION: For this evaluation, substrates must be chosen which are of sufficient strength to support the designated load. To achieve this, a nonwoven/polyethylene film laminate was constructed which can maintain its form with a 1000 g/in. load at 100° F. This was done by laminating a heavy basis weight nonwoven to a polyethylene film with a commercially available high strength styrenic block copolymer (SIS) based hot melt adhesive available from Ato Findley, Inc.

ADHESIVE APPLICATION: All adhesives were applied in a spiral spray pattern, 15 mg/in$^2$, ⅜ in. wide, to the nonwoven side of the above described laminate. Open time for this application was 0.5 sec., and application temperature was 350° F. The bond was formed with the nonwoven side of the second laminate using a roller compression of 9 p.s.i.

ELEVATED TEMPERATURE EVALUATION: All samples were allowed to set for a minimum of 24 hours prior to testing. Samples were cut to 1" wide lengths perpendicular to the direction of the spiral pattern. Samples were then tested by hanging in a 100° F. circulating air oven.

STATIC PEEL TESTING: A 500 g weight was attached to each sample in a conventional peel mode test, and a timer was begun. The time elapsed until the bond failed was recorded for each sample in minutes. A minimum of five samples were run for each formulation. To be acceptable, samples must last 11 hours, or 660 minutes.

STATIC SHEAR TESTING: A 1000 g weight was attached to each sample in a conventional shear mode test, and a timer was begun. The time lapsed until the bond failed was recorded for each sample in minutes. A minimum of five samples were run for each formulation. To be acceptable, samples must last 11 hours, or 660 minutes.

The invention is further illustrated by way of the examples which are set forth below.

EXAMPLE 1

The following adhesive blend was prepared in accordance with the present invention. When tested, the adhesive performed exceptionally well by providing adequate bond strength in the peel mode and shear mode at elevated temperature. This example has excellent high temperature strength due to the polybutylene homopolymer, high softening point amorphous polyalpha-olefin, and high softening point tackifier used.

| Weight % | Ingredient | Commercial Source | Generic Name |
| --- | --- | --- | --- |
| 29.9 | Eastotac H-130R | Eastman Chemical Company | resin |
| 19.9 | Polybutylene DP 0800 | Shell Chemical Company | polybutylene |
| 39.8 | Rextac 2115 | Rexene Products | polyolefin |
| 9.5 | Epolene N15 | Eastman Chemical Company | wax |
| 0.9 | Irganox 1010-FF | Ciba Additives | stabilizer |

EXAMPLE 2

A formulation that is an example of this invention which does not contain wax. This example uses both a high softening point tackifier and amorphous polyalpha-olefin in conjunction with a blend of a polybutylene homopolymer and polybutylene-ethylene copolymer. The absence of wax in this formula increases the viscosity, but gives this compound greater flexibility and a much longer open time than Example 1.

| Weight % | Ingredient | Commercial Source | Generic Name |
| --- | --- | --- | --- |
| 30 | Eastotac H-130R | Eastman Chemical Company | resin |
| 20 | Polybutylene DP 0800 | Shell Chemical Company | polybutylene |
| 29 | Rextac 2115 | Rexene Products | polyolefin |
| 20 | Polybutylene DP 8910 | Shell Chemical Company | polybutylene |
| 1 | Irganox 1010-FF | Ciba Additives | stabilizer |

EXAMPLE 3

A formulation that is an example of this invention which uses a polybutene plasticizer in place of the amorphous polyalpha-olefin. In addition, it uses a polybutylene-ethylene copolymer.

| Weight % | Ingredient | Commercial Source | Generic Name |
| --- | --- | --- | --- |
| 15 | Eastotac H-100W | Eastman Chemical Company | resin |
| 50 | Polybutylene DP 8910 | Shell Chemical Company | polybutylene |
| 15 | Indopol H100 | Amoco | polybutene plasticizer |
| 19.5 | Epolene N15 | Eastman Chemical Company | wax |
| 0.5 | Irganox 1010-FF | Ciba Additives | stabilizer |

EXAMPLE 4

This formulation contains a blend of a polybutylene homopolymer and a polybutylene-ethylene copolymer with a lower softening point tackifier and a lower softening point amorphous polyalpha-olefin.

| Weight % | Ingredient | Commercial Source | Generic Name |
| --- | --- | --- | --- |
| 25 | Eastotac H-100W | Eastman Chemical Company | resin |
| 12.5 | Polybutylene DP 0800 | Shell Chemical Company | polybutylene |
| 12.5 | Polybutylene DP 8910 | Shell Chemical Company | polybutylene |
| 19.5 | Epolene N15 | Eastman Chemical Company | wax |
| 0.5 | Irganox 1010-FF | Ciba Additives | stabilizer |
| 30 | Rextac 2715 | Rexene Products | polyolefin |

EXAMPLE 5

This formula is an example of this invention that does not contain a tackifier resin. On some porous substrates mechanical bonding is more critical than adhesion to the surface of the substrate. In these cases, formulations which are able to flow into the porous substrate "lock" in the substrate and form mechanical bonds which resist peel and shear forces. Thus, a tackifying resin is not necessary to promote adhesion. This formula is a blend of a polybutene plasticizer, a polypropylene wax, and a polybutylene-ethylene copolymer.

| Weight % | Ingredient | Commercial Source | Generic Name |
| --- | --- | --- | --- |
| 65 | Polybutylene DP 8910 | Shell Chemical Company | polybutylene |
| 15 | Indopol H100 | Amoco | polybutene plasticizer |
| 19.5 | Epolene N15 | Eastman Chemical Company | wax |
| 0 | Irganox 1010-FF | Ciba Additives | stabilizer |

Control 1

The formulation (designated "Control 1") is a commercial hot melt adhesive available from Ato Findley, Inc. under the trade designation H2104.

H2104 is typically used in nonwoven applications which require relatively high strength, such as elastic attachment. H2104 is an example of a high strength hot melt adhesive representative of the type of prior art hot melt adhesive typically used in high stress diaper applications, e.g. elastic attachment.

Control 2

This formulation (designated "Control 2") is an illustration of a blend of a polybutylene homopolymer, high softening point tackifier, and high softening point amorphous polyalpha-olefin that uses an amount of plasticizer in excess of that specified in the invention. This product does not possess the needed shear or peel resistance.

| Weight % | Ingredient | Commercial Source | Generic Name |
|---|---|---|---|
| 30 | Eastotac H-130R | Eastman Chemical Company | resin |
| 20 | Polybutylene DP 0800 | Shell Chemical Company | polybutylene |
| 35 | Indopol H100 | Amoco | polybutene plasticizer |
| 14.5 | Vestoplast 608 | Huls Chemical Company | polyolefin |
| 0.5 | Irganox 1010-FF | Ciba Additives | stabilizer |

Control 3

This formulation (designated "Control 3") is an illustration of a blend of a polybutylene homopolymer and a poly(butylene-ethylene) copolymer, medium softening point tackifier, and a high softening point amorphous polyalpha-olefin and high softening point polypropylene wax, that uses an amount of polybutylene polymer less than described in this invention. This product does not possess the needed peel resistance for this application, although it has adequate shear and a softening point comparable to Examples 1–5.

| Weight % | Ingredient | Commercial Source | Generic Name |
|---|---|---|---|
| 20 | Escorez 1315 | Exxon Chemical Company | resin |
| 5 | Polybutylene DP 0800 | Shell Chemical Company | polybutylene |
| 5 | Polybutylene DP 8910 | Shell Chemical Company | polybutylene |
| 9.5 | Epolene N15 | Eastman Chemical Company | wax |
| 0.5 | Irganox 1010-FF | Ciba Additives | stabilizer |
| 60 | Rextac 2115 | Rexene Products | polyolefin |

Test Results

Tests performed in accordance with the previous procedures set forth herein to determine peel strength and shear strength for the above-described formulations resulted in the data reported in Tables 1 and 2, respectively. Softening points and viscosities for these compositions are reported in Tables 3 and 4, respectively.

TABLE 1

| Formula | Static Peel in Minutes (Average of 5 Samples) |
|---|---|
| Control 1 | 17 |
| Control 2 | 0.3 |
| Control 3 | 23 |
| Example 1 | 1000+ |
| Example 2 | 1000+ |
| Example 3 | 1000+ |
| Example 4 | 1000+ |
| Example 5 | 1000+ |

TABLE 2

| Formula | Static Shear in Minutes (Average of 5 Samples) |
|---|---|
| Control 1 | 29 |
| Control 2 | 397 |
| Control 3 | 1000+ |
| Example 1 | 1000+ |
| Example 2 | 1000+ |
| Example 3 | 1000+ |
| Example 4 | 1000+ |
| Example 5 | 1000+ |

TABLE 3

| Formula | Softening Point ° F. (Herzog Ring and Ball Tester) |
|---|---|
| Control 1 | 217.4 |
| Control 2 | 242.6 |
| Control 3 | 311.4 |
| Example 1 | 311 |
| Example 2 | 281.7 |
| Example 3 | 315 |
| Example 4 | 314.3 |
| Example 5 | 324 |

TABLE 4

| Formula | Viscosity at 325° F. cP | Viscosity at 350° F. cP | Viscosity at 375° F. cP |
|---|---|---|---|
| Control 1 | 4500 | 2700 | 1550 |
| Control 2 | 5675 | 3615 | 2465 |
| Control 3 | 3700 | 2600 | 1850 |
| Example 1 | 7300 | 5400 | 3500 |
| Example 2 | 31200 | 21050 | 14125 |
| Example 3 | 15550 | 10425 | 7250 |
| Example 4 | 10375 | 6813 | 4688 |
| Example 5 | 10625 | 6175 | 4425 |

PROCESSING COMPARISON: Hot melt adhesives must be relatively low in viscosity to process well on conventional coating equipment. Below is a comparison of a typical styrenic block copolymer-based adhesive, H2104, which processes well, and Example 1, a polybutylene-based adhesive. This example also processes well. The temperatures listed represent typical hot melt adhesive application and/or processing temperatures.

Viscosity

| H2104 | | Example 1 | |
|---|---|---|---|
| Viscosity (cPs) at 325° F. | 4500 | Viscosity (cPs) at 325° F. | 7300 |
| Viscosity (cPs) at 350° F. | 2700 | Viscosity (cPs) at 350° F. | 5400 |
| Viscosity (cPs) at 375° F. | 1550 | Viscosity (cPs) at 375° F. | 3500 |

Heat Stability

| H2104 Samples Aged 48 Hours at 350° F. | | Example 1 Samples Aged 48 Hours at 365° F. | |
|---|---|---|---|
| Viscosity (cPs) at 325° F. | 3650 | Viscosity (cPs) at 350° F. | 5390 |
| Change in viscosity | −19% | Change in viscosity | −0.2% |

Data indicate that Example 1 must be run at slightly higher temperatures to match the viscosity of H2104. Both products, however, easily process under typical processing conditions. In addition, Example 1 maintains its viscosity better than H2104 when aged at elevated temperatures for extended periods of time.

We claim:

1. A high peel and shear strength hot melt adhesive composition consisting essentially of a blend of:
   (a) about 15% to about 65% by weight of a polybutylene polymer, said polybutylene polymer selected from the group consisting of polybutylene homopolymer, polybutylene copolymer, and blends of polybutylene homopolymer and copolymer;
   (b) about 0.1% to about 3% by weight of a stabilizer; and
   (c) about 5% to about 20% by weight of a polypropylene wax having a softening point of 200° F. to 350° F.;
   the remaining ingredients chosen from one or more of the following components so that the ingredients add up to 100% by weight based on the weight of the entire composition:
   (d) about 0% to about 60% by weight of a hydrocarbon tackifying resin, said tackifying resin is selected from the group consisting of aliphatic hydrocarbon resins, hydrogenated aromatic hydrocarbon resins, hydrogenated aliphatic hydrocarbon resins and hydrogenated aromatic/aliphatic hydrocarbon resins; and
   (e) about 0% to about 30% by weight of a plasticizer selected from the group consisting of mineral oil, and polybutene having a molecular weight of 2000 or less;
   and wherein the minimum polybutylene polymer content is 15% by weight;
   and wherein the adhesive composition has a viscosity of less than 25,000 cP at 350° F. and a melt point higher than 250° F., and withstands a peel mode force of 500 grams at 100° F. for a minimum of about 11 hours and further withstands a shear mode force of 1000 grams at 100° F. for a minimum of about 11 hours.

2. A hot melt adhesive composition as claimed in claim 1 wherein said polybutylene polymer is a poly(butylene-ethylene) copolymer.

3. A high peel and shear strength hot melt adhesive composition, consisting of:
   (a) about 65% by weight of a polybutylene polymer, said polybutylene polymer selected from the group consisting of polybutylene homopolymer, polybutylene copolymer, and blends of polybutylene homopolymer and copolymer;
   (b) about 19.5% by weight of a polypropylene wax having a softening point of 200° F. to 350° F.
   (c) about 15% by weight of a plasticizer wherein said plasticizer is selected from the group consisting of mineral oil, and a polybutene having a molecular weight of 2,000 or less;
   (d) about 0.5% by weight of a stabilizer; and
   (e) wherein the adhesive composition has a viscosity of less than 25,000 cP at 350° F. and a melt point higher than 250° F., and withstands a peel mode force of 500 grams at 100° F. for a minimum of about 11 hours and further withstands a shear mode force of 1000 grams at 100° F. for a minimum of about 11 hours.

4. A hot melt adhesive composition as claimed in claim 3 wherein said polybutylene polymer is a poly(butylene-ethylene) copolymer.

5. A high peel and shear strength hot melt adhesive composition, consisting essentially of:
   (a) about 50% by weight of a polybutylene polymer, said polybutylene polymer selected from the group consisting of polybutylene homopolymer, polybutylene copolymer, and blends of polybutylene homopolymer and copolymer;
   (b) about 15% by weight of a plasticizer selected from the group consisting of mineral oil and polybutene having a molecular weight of 2000 or less;
   (c) about 15% by weight of a hydrocarbon tackifying resin, said tackifying resin is selected from the group consisting of aliphatic hydrocarbon resins, hydrogenated aromatic hydrocarbon resins, hydrogenated aliphatic hydrocarbon resins and hydrogenated aromatic/aliphatic hydrocarbon resins;
   (d) about 19.5% by weight of a polypropylene wax having a softening point of 200° F. to 350° F.;
   (e) about 0.5% by weight of a stabilizer; and
   (f) wherein the adhesive composition has a viscosity of less than 25,000 cP at 350° F. and a melt point higher than 250° F., and withstands a peel mode force of 500 grams at 100° F. for a minimum of about 11 hours and further withstands a shear mode force of 1000 grams at 100° F. for a minimum of about 11 hours.

6. A hot melt adhesive composition as claimed in claim 5 wherein said polybutylene polymer is a poly(butylene-ethylene) copolymer.

\* \* \* \* \*